United States Patent [19]

Lemboke et al.

[11] Patent Number: 4,901,842
[45] Date of Patent: Feb. 20, 1990

[54] APPARATUS FOR TURNING STACKS AND CONVEYORS THEREFOR

[75] Inventors: Horst Lemboke, Hamburg; Wolfram Wolf, Bilsen, both of Fed. Rep. of Germany

[73] Assignee: E.C.H. Will GmbH, Nedderfeld, Fed. Rep. of Germany

[21] Appl. No.: 195,076

[22] Filed: May 17, 1988

[30] Foreign Application Priority Data

May 29, 1987 [DE] Fed. Rep. of Germany ....... 3718206

[51] Int. Cl.⁴ ............................................. B65G 47/24
[52] U.S. Cl. ................................ 198/415; 198/688.1; 198/623; 198/847
[58] Field of Search ...................... 198/415, 623, 688.1, 198/699.1, 844, 846, 847; 271/198

[56] References Cited

U.S. PATENT DOCUMENTS

| 586,866 | 7/1897 | Potter .................................. 198/415 |
| 2,984,594 | 5/1961 | Runton .................................. 198/847 |
| 3,084,090 | 4/1963 | Rambo et al. ..................... 198/415 X |
| 3,521,322 | 7/1970 | Michael et al. ............... 198/699.1 X |
| 3,731,789 | 5/1977 | Fleischhauer ..................... 198/699.1 |
| 3,749,226 | 7/1973 | Meschke et al. ..................... 198/415 |
| 4,085,839 | 4/1978 | Crawford ........................ 198/415 X |
| 4,184,589 | 1/1980 | Habegger ............................. 198/847 |
| 4,572,357 | 2/1986 | Pearl ............................ 198/688.1 X |
| 4,720,006 | 1/1988 | Lenherr ............................ 198/415 |

FOREIGN PATENT DOCUMENTS

| 2161081 | 6/1973 | Fed. Rep. of Germany ... 198/699.1 |
| 2853691 | 6/1980 | Fed. Rep. of Germany ...... 198/847 |
| 3221601 | 3/1983 | Fed. Rep. of Germany . |
| 67078 | 5/1969 | German Democratic Rep. ..................................... 198/415 |
| 2153791 | 8/1985 | United Kingdom ............. 198/699.1 |
| 2186252 | 8/1987 | United Kingdom ................ 198/415 |

Primary Examiner—Robert J. Spar
Assistant Examiner—D. Glenn Dayoan
Attorney, Agent, or Firm—Peter K. Kontler

[57] ABSTRACT

Apparatus for changing the orientation of stacks of paper sheets has two parallel transporting units each having at least one belt conveyor with outwardly extending bristles which engage the stacks and reduce the likelihood of unpredictable slippage of the lowermost sheets of the stacks relative to the adjacent reaches of the belt conveyors while the stacks are advanced from a stack supplying conveyor to a stack receiving conveyor. At the same time, the stacks are caused to change their orientation by turning about axes extending at right angles to the adjacent reaches of the belt conveyors as a result of travel of the conveyor or conveyors forming part of one of the transporting units at a speed which is greater than the speed of the conveyor or conveyors of the other transporting unit. Each belt conveyor can have an outer layer of velour with a pile of outwardly extending bristles, an inner layer of textile fabric, and a synthetic plastic intermediate layer which is bonded to the inner and outer layers. The bristles on those reaches of the conveyors which support the stacks are inclined with reference to the direction of transport of the stacks.

13 Claims, 2 Drawing Sheets

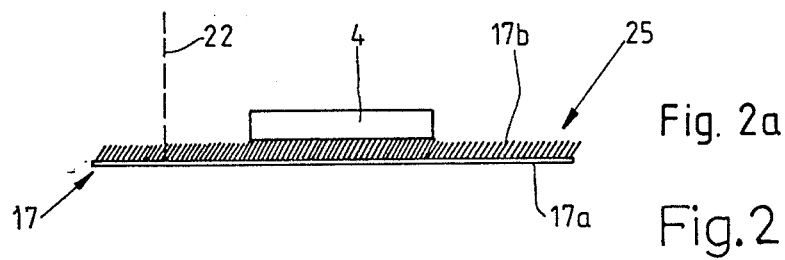
Fig. 2a
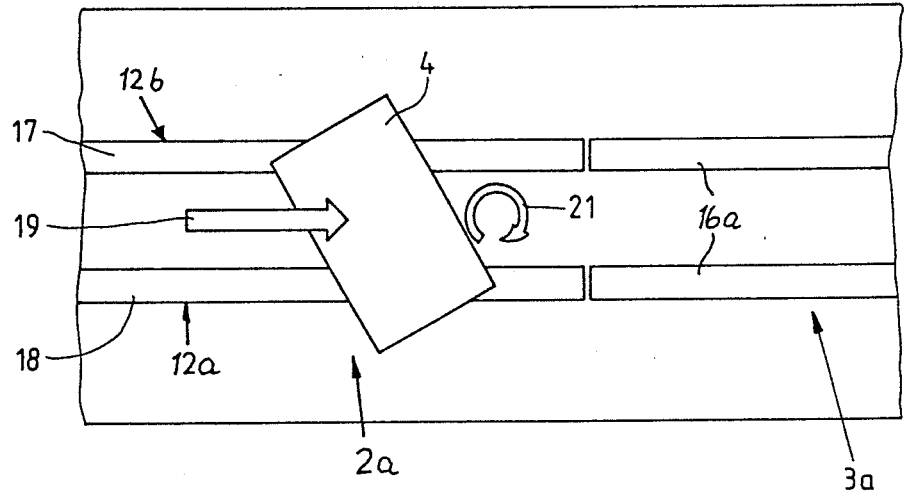
Fig. 2
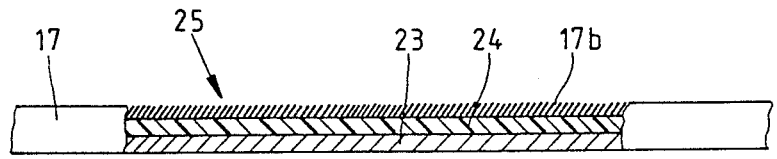
Fig. 2b
Fig. 3

APPARATUS FOR TURNING STACKS AND CONVEYORS THEREFOR

BACKGROUND OF THE INVENTION

The invention relates to improvements in apparatus for transporting and for simultaneously changing the orientation of relatively large (bulky) commodities, particularly for transporting and simultaneously turning stacks of superimposed sheets or panels which are made of cardboard, paper, metallic or plastic foil, textile material or the like.

It is known to change the orientation of stacks of paper sheets during transport along an elongated path wherein the stacks rest on two transporting units each of which has one or more endless bent conveyors advancing in the same direction but at different speeds. Reference may be had, for example, to commonly owned German Offenlegungsschrift No. 32 21 601 of Lembcke et al. Such apparatus can be employed to change the orientation of successive stacks through an angle of 90°, 180° or any other desired angle. It is also known to vary the speed of the belt conveyor or conveyors in at least one of the transporting units to thus select the extent to which the stack or stacks change their orientation during travel with the upper reaches of the conveyors of the two transporting units. Presently known apparatus of the above outlined character exhibit certain drawbacks, especially as concerns the predictability of frictional engagement between the undersides of the stacks and the belt conveyors as well as the likelihood of defacing or otherwise adversely influencing the lowermost sheet or sheets of the stacks.

OBJECTS AND SUMMARY OF THE INVENTION

An object of the invention is to provide a novel and improved apparatus which can transport and turn successive stacks of paper sheets or the like with a degree of predictability greatly exceeding that of heretofore known apparatus.

Another object of the invention is to provide an apparatus wherein the conveyors of the transporting units are less likely to slip relative to the transported commodities and/or vice versa in the course of the transporting and orientation changing operation than in heretofore known apparatus.

A further object of the invention is to provide an apparatus wherein slippage, if any, of the transported commodities relative to the belt conveyors and/or vice versa, is more predictable than in heretofore known apparatus.

An additional object of the invention is to provide a production line, e.g., a series of machines for assembling, wrapping and packing reams or other accumulations of paper sheets, which embodies the above outlined apparatus.

Still another object of the invention is to provide novel and improved belt conveyors for use in the above outlined apparatus.

A further object of the invention is to provide one or more endless belt conveyors which can be used in the above outlined apparatus and are designed with a view to reduce the likelihood of unpredictable movements of the conveyor or conveyors relative to the transported commodities and/or vice versa while the commodities are in the process of advancing from the receiving end to the discharging end of the apparatus and of simultaneously changing their orientation through 90°, 180° or any other desired angle.

One feature of the present invention resides in the provision of an apparatus for transporting and simultaneously changing the orientation of (turning) bulky commodities, particularly stacks of superimposed paper sheets, cardboard panels, metallic or plastic foils and the like. The apparatus comprises a plurality of substantially parallel elongated transporting units each of which includes at least one endless belt conveyor, and means for driving the conveyors of the transporting units in the same direction but at different speeds so that a commodity which is deposited onto the transporting units to simultaneously rest on conveyors which are driven at different speeds is compelled to change its orientation (i.e., to turn) while advancing in the aforementioned direction. The conveyors have outer sides which are contacted by the commodities resting thereon, and the outer side of at least one of the conveyors has bristles.

The conveyors have upper reaches which carry the commodities during movement in the aforementioned direction and are disposed in or at least very close to a common plane. The bristles preferably make oblique angles with the common plane, i.e., the bristles are preferably inclined with reference to a line or plane which is normal to the common plane.

The one conveyor can include a layer of velour having a pile or nap which is constituted by the bristles.

The transporting units include a first and a second transporting unit, and the conveyors of each of these first and second units are preferably provided with bristles. The arrangement is preferably such that the bristles of the conveyor or conveyors of one of the first and second units are inclined with reference to the bristles of the conveyor or conveyors of the other of the first and second units. It has been found that the predictability with which the conveyors of the first and second units can advance and change the orientation of stacks of paper sheets or like bulky commodities can be enhanced if the bristles of each conveyor forming part of the faster transporting unit are inclined in, and if the bristles of each conveyor forming part of the slower transporting unit are inclined counter to, the aforementioned direction.

At least one of the transporting units can comprise a series of successive conveyors which are disposed one after the other in the direction of advancement of commodities.

The inclination of bristles on the conveyors forming part of the first and second transporting units is preferably such that the height of that portion of the pile of bristles which carries a commodity while the commodity is in the process of changing its orientation, as a result of movement of the conveyors of the first and second transporting units at different speeds, increases beyond the height of the pile when the latter does not support a commodity.

The at least one conveyor preferably comprises a plurality of layers including an outer layer with a pile which is constituted by bristles.

Another feature of the invention resides in the provision of an endless belt conveyor which is particularly suited for use in the aforediscussed apparatus for transporting and simultaneously changing the orientation of stacks of paper sheets and the like. The conveyor comprises a plurality of layers including an outer layer with a plurality of outwardly extending bristles. Such outer layer can consist of or contain velour and has a pile which is constituted by the bristles. An inner layer of the conveyor can be made of or can contain a textile fabric. A third or intermediate layer of the conveyor can be made of or can contain a plastic material which is bonded (e.g., therammally or by an adhesive) to the inner and/or outer layer.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a schematic plan view of an apparatus which embodies one form of the invention and includes two elongated parallel transporting units for stacks of paper sheets and the like;

FIG. 2 is a fragmentary plan view of a modified apparatus;

FIG. 2a is a fragmentary elevational view of one conveyor of one of the transporting units of the apparatus which is shown in FIG. 2;

FIG. 2b is a fragmentary elevational view of one conveyor of the other transporting unit in the apparatus of FIG. 2; and FIG. 3 is an enlarged fragmentary partly side elevational and partly longitudinal vertical sectional view of the conveyor which is shown in FIG. 2a.

DESCRIPTION OF PREFERRED EMBODIMENTS

Figure 1:
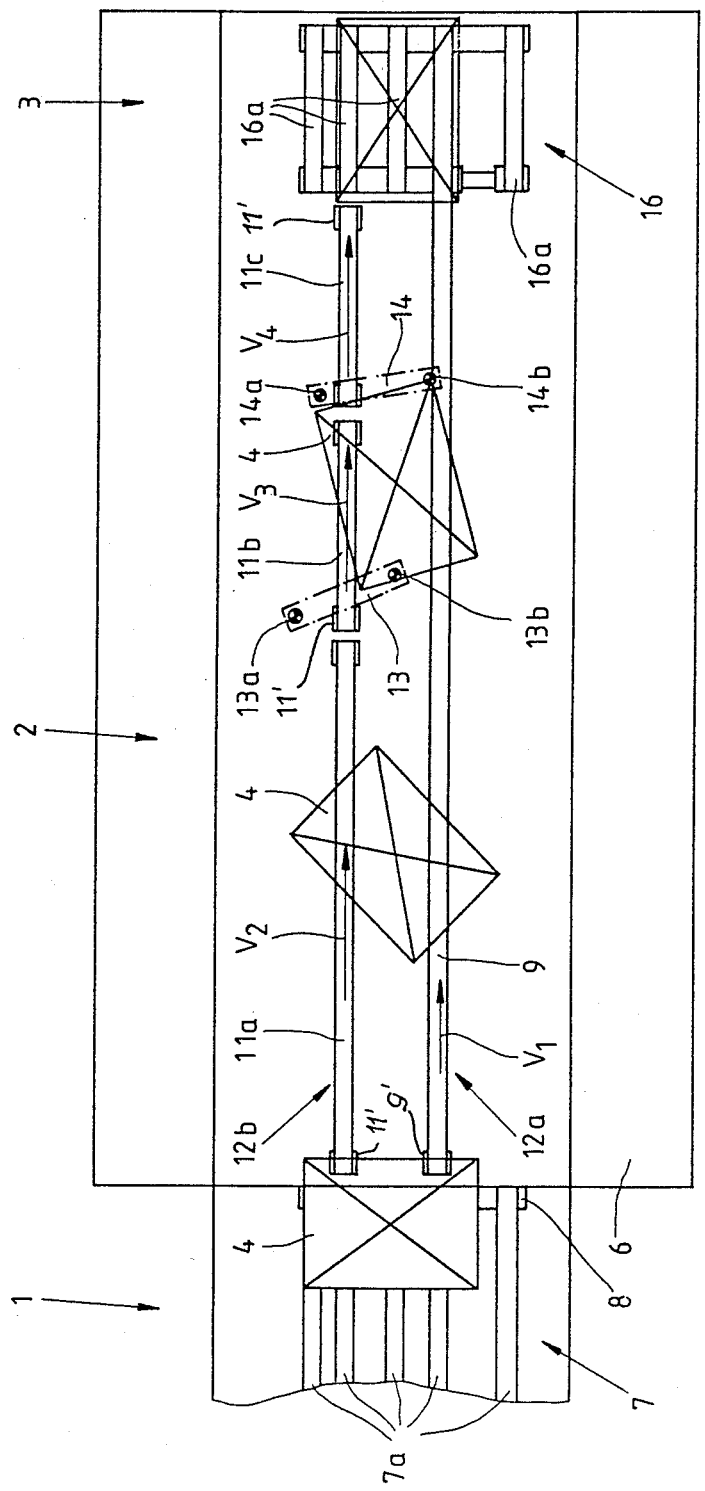

Referring first to FIG. 1, there is shown an apparatus which is used to transport a series of discrete bulky commodities 4 each of which can constitute a stack of superimposed sheets made of paper, cardboard, metallic or plastic foil or textile material. The apparatus comprises first conveying means 1 serving to deliver a succession of stacks 4 in a predetermined starting orientation, particularly in such a way that the width of the stack is greater than its length (as considered in the direction of advancement of stacks 4 with the conveying means 1). The conveying means 1 comprises a group or array 7 of, for example, five endless belt conveyors 7a which are disposed in parallel vertical planes and are trained over a driven pulley 8 so that they advance successive stacks 4 in a direction to the right, namely into the range of a second conveying means 2 which is constructed and assembled in accordance with a feature of the present invention. The endless belt conveyors 7a of the group or array 7 can be replaced with other suitable means for delivering stacks 4 to the conveying means 2; for example, these belt conveyors can be replaced with discrete rows of relatively short rolls or with a single row of relatively long rolls (e.g., having a length matching or approximating that of the pulley 8). The short or long rolls may but need not be driven.

The conveying means 2 comprises a plurality of transporting units. The illustrated conveying means 2 comprises two elongated spaced-apart parallel transporting units 12a and 12b. The transporting unit 12a includes a single elongated endless belt conveyor 9, and the transporting unit 12b includes a series of three discrete endless belt conveyors 11a, 11b, 11c. The upper reaches of the belt conveyors 9 and 11a–11c are disposed in or very close to a common plane, particularly in a substantially horizontal plane.

The belt conveyor 9 is driven by one of its pulleys 9' at a relatively low speed $V_1$. The arrow denoting this speed is indicative of the direction of advancement as well as of the speed of the upper reach of the conveyor 9. The belt conveyors 11a, 11b, 11c are driven at higher speeds which are denoted by the arrows $V_2$, $V_3$ and $V_4$, respectively. The direction of travel of the upper reaches of the conveyors 9 and 11a–11c is the same; however, the speed of the conveyor 11a exceeds that of the conveyor 9. The speed of the conveyor 11b can exceed or can be less than that of the conveyor 11a and/or conveyor 11c. It is also possible to modify the speeds of the conveyors 9 and 11a–11c in such a way that the upper reach of the conveyor 9 travels faster than the upper reaches of the conveyors 11a–11c. The arrangement is preferably such that the speed of the conveyor 9 and/or of the conveyors 11a–11c is variable. The means for driving the conveyors 11a–11c includes at least one of the respective pulleys 11'.

The apparatus further comprises third conveying means 3 which receives properly reoriented stacks 4 from the belt conveyors 9 and 11c of the conveying means 2. The conveying means 3 includes a group or array 16 of endless belt conveyors 16a which are driven at the same speed (preferably at the speed of the conveyor 9) so that the orientation of a commodity 4 which has advanced beyond the conveyor 11c of the transporting unit 12b remains unchanged. It will be noted that the rightmost portion of the upper reach of the belt conveyor 9 of the transporting unit 12a forms part of the conveying means 3. The latter can serve to transport properly reoriented stacks 4 to a further processing station, e.g., to a station where the stacks 4 are draped into sheets of paper or plastic foil, or to a station where the stacks are introduced into boxes or into other types of receptacles. The arrangement can be such that a further processing apparatus can receive properly reoriented stacks directly from the conveying means 3 or from a conveying means which receives (directly or indirectly) reoriented stacks 4 from the conveying means 3.

The apparatus also comprises two monitoring means 13 and 14 which serve to ascertain the orientation of successive stacks 4 on their way from the conveying means 1 to the conveying means 3. The monitoring means 13 comprises two photoelectronic detectors 13a, 13b adjacent the receiving end of the conveyor 11b. The detectors 13a, 13b operate in a plane which coincides with the plane of the front side of an oncoming stack 4 if the (intermediate) orientation of the stack 4 at the time of reaching the receiving end of the conveyor 11b is proper. If not, the monitoring means 13 generates a signal which alters the speed $V_2$ of the conveyor 11a and/or the speed $V_3$ of the conveyor 11b in a sense to ensure that the intermediate orientation of next-following stacks 4 will match the desired intermediate orientation. The photoelectronic detectors 14a, 14b of the monitoring means 14 operate in a second plane which is inclined with reference to the plane of operation of the detectors 13a, 13b and coincides with the plane of the front side of an oncoming stack 4 if the orientation of such front side at the time of reaching the receiving end of the belt conveyor 11c (where the detectors 14a, 14b are mounted in the frame 6 of the improved apparatus)

matches the desired orientation. If not, the monitoring means 14 transmits a signal which is used to change the speed $V_3$ of the belt conveyor 11b and/or the speed $V_4$ of the conveyor 11c in order to ensure that the final orientation of each stack 4 that follows will match the desired final orientation (e.g., turned at an angle of 90° or 180° with respect to the initial orientation on the conveying means 1).

The mode of operation of the apparatus of FIG. 1 is or can be identical to that of the apparatus which is disclosed in the commonly owned German patent application Serial No. P 37 02 925.8 or in the commonly owned U.S. Pat. application Ser. No. 011,935 filed Feb. 6, 1987 now U.S. Pat. No. 4,807,739 by Wolfram Wolf et al. for "Method of and apparatus for transporting and turning stacks of paper sheets". Therefore, a detailed description of such mode of operation is not necessary.

FIG. 2 shows a portion of a modified apparatus wherein each of the transporting units 12a, 12b comprises or can comprise a single endless belt conveyor,18,17, respectively. The upper reaches of these belt conveyors are disposed in or very close to a common plane (e.g., a horizontal plane) and serve to advance, and to simultaneously change the orientation of, a series of stacks 4 or analogous commodities. The direction of transport is indicated by the arrow 19, and the direction of turning of the stacks which rest on and move with the upper reaches of the belt conveyors 17, 18 is indicated by the arrow 21. The conveyor 17 is assumed to be driven at a speed exceeding that of the conveyor 18; therefore, the stack 4 on the upper reaches of these conveyors turns in a clockwise direction.

The conveying means 3a of the apparatus of FIG. 2 includes two endless belt conveyors 16a which are aligned with the conveyors 17, 18 of the conveying means 2a and serve to advance properly reoriented stacks 4 to the next processing station.

In accordance with a feature of the invention, at least one of the belt conveyors forming part of the second conveying means 2 or 2a is provided with outwardly extending bristles which contact the lowermost sheets of the stacks 4 resting on the upper reach of the one conveyor. In the illustrated embodiments, all belt conveyors (9 and 11a-11c in FIG. 1, and 17, 18 in FIG. 2) of the second conveying means 2 or 2a are provided with outwardly extending bristles. This can be seen in FIGS. 2a and 2b which respectively show portions of the belt conveyors 17 and 18. The belt conveyor 17 (which is driven at a speed exceeding that of the conveyor 18) has a substrate 17a for a pile or nap of bristles 17b which make an oblique angle with the plane of the upper reach of the belt conveyor 17, i.e., the bristles 17b are inclined with reference to a line 22 (indicated by broken lines) which extends at right angles to the plane of the substrate in the upper reach of the conveyor 17. The arrangement is such that the bristles 17b of the pile or nap on the substrate 17a are inclined in the direction (arrow 19 in FIG. 2) of transport of stacks 4 with the transporting units 12a, 12b. As can be seen in FIG. 2a, the height of that portion of the pile of bristles 17b which actually supports a stack 4 exceeds the height of the remaining portion of the pile. The substrate 17a and the pile of bristles 17b together form an outer layer 25 of the belt conveyor 17.

The belt conveyor 18 (FIG. 2b) also comprises an outer layer 25 with a substrate 18a and a pile or nap of bristles 18b which are inclined counter to the direction (arrow 19 in FIG. 2) of transport of stacks 4 by the units 12a and 12b. The inclination of the bristles 18b relative to the line 22 which extends at right angles to the common plane of the upper reaches of the belt conveyors 17, 18 is or can be the same as that of the bristles 17b (except that the bristles 17b and 18b are inclined in opposite directions, namely in and counter to the direction which is indicated by the arrow 19). FIG. 2b shows that the height of that portion of the pile of bristles 18b which carries a stack 4 is greater than the height of the remaining portion of the pile.

The just described inclination of the bristles 17b, 18b relative to the common plane of the upper reaches of the conveyors 17, 18 has been found to contribute significantly to predictable transport and reorientation of stacks 4 during travel with the transporting units 12a, 12b of the conveying means 2 or 2a. More specifically, friction between the upper reaches of the belt conveyors 17, 18 and the lowermost sheets of the stack 4 resting thereon is not likely to vary at random which could affect the predictability of the reorienting operation. The magnitude of friction between the underside of the lowermost sheet of a stack 4 and the bristles 17b, 18b is especially predictable if the bristles (17b) of the faster conveyor (17) are inclined in the direction of transport and if the bristles (18b) of the slower conveyor (18) are inclined counter to the direction of transport of the stacks 4.

FIG. 3 shows a presently preferred embodiment of a belt conveyor 9, 11a, 11b, 11c, 17 or 18 (the belt conveyor 17 of the conveying means 2a in the apparatus of FIG. 2 is actually shown in FIG. 3). This conveyor is a laminated structure including an outer layer 25 having a substrate 17a and a pile or nap of bristles 17b, an inner layer 23 of textile fabric, and an intermediate or third layer 24 of suitable synthetic plastic material which is welded or glued to the inner layer 23 and/or outer layer 25. The substrate 17a and the pile or nap of bristles 17b together form a velour layer.

The belt conveyors of the first conveying means 1 and/or of the third conveying means 3 or 3a may but need not be provided with outwardly extending bristles.

An important advantage of the conveyors with outwardly extending bristles is that the rate at which successive stacks 4 are caused to turn during transport by the units 12a, 12b is more predictable than in conventional apparatus which employ belt conveyors with smooth external surfaces. The provision of bristles whose inclination depends upon the relative speed of the respective conveyors contributes still further to predictability of the transporting and orientation changing action. Belt conveyors of the type shown in FIG. 3 can be installed in existing combined stack transporting and turning apparatus as superior substitutes for heretofore used belt conveyors.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for transporting and simultaneously changing the orientation of bulky commodities, particularly stacks of paper sheets and the like, comprising a plurality of substantially parallel transporting units each including at least one endless belt conveyor; and means for driving said conveyors in the same direction but at different speeds so that a commodity which is deposited onto said transporting units to simultaneously rest on conveyors which are driven at different speeds is compelled to change its orientation while advancing in said direction, said conveyors having upper reaches which carry the commodities during movement in said direction and are disposed in or close to a common plane, said conveyors further having outer sides which are contacted by the commodities resting on said upper reaches and the outer side of at least one of said conveyors having at least substantially parallel bristles which make oblique angles with said plane to enhance the predictability of transport and reorientation of said commodities.

2. The apparatus of claim 1, wherein said at least one conveyor includes a layer of velour having a pile constituted by said bristles.

3. The apparatus of claim 1, wherein at least one of said units comprises a series of conveyors disposed one after the other in said direction.

4. The apparatus of claim 1, wherein said one conveyor has a plurality of layers including an outer layer with a pile constituted by said bristles.

5. The apparatus of claim 1, wherein said one conveyor has a plurality of layers including an outer layer with said bristles extending outwardly therefrom.

6. The apparatus of claim 5, wherein said outer layer consists of velour and has a pile constituted by said bristles.

7. The apparatus of claim 5, wherein said layers further include an inner layer of textile fabric.

8. The apparatus of claim 7, wherein said layers further include an intermediate layer of plastic material which is bonded to at least one of said inner and outer layers 9. Apparatus for transporting and simultaneously changing the orientation of bulky commodities, particularly stacks of paper sheets and the like, comprising a plurality of substantially parallel transporting units each including at least one endless belt conveyor, said transporting units including a first and a second unit; and means for driving the conveyors of said first and second units in the same direction but at different speeds so that a commodity which is deposited onto said first and second units to simultaneously rest on conveyors which are driven at different speeds is compelled to change its orientation while advancing in said direction, the conveyors of said first and second units having outer sides which are contacted by the commodities resting thereon and the outer sides the conveyors of said first and second units having bristles, the bristles of the conveyors of said first and second units being inclined relative to each other.

10. The apparatus of claim 9, wherein said conveyors have upper reaches which carry the commodities during movement in said direction, the bristles of conveyors of said first and second units being inclined in and counter to said direction, respectively.

11. The apparatus of claim 10, wherein the conveyor of said first unit is driven at a speed exceeding that of the conveyor of said second unit.

12. The apparatus of claim 10, wherein the conveyor of said second unit is driven at a speed less than that of the conveyor of said first unit.

13. Apparatus for transporting and simultaneously changing the orientation of bulky commodities, particularly stacks of paper sheets and the like, comprising a plurality of substantially parallel transporting units each including at least one endless belt conveyor; and means for driving said conveyors in the same direction but at different speeds so that a commodity which is deposited onto said transporting units to simultaneously rest on conveyors which are driven at different speeds is compelled to change its orientation while advancing in said direction, said conveyors having outer sides which are contacted by the commodities resting thereon and the outer side of at least one of said conveyors having bristles, said bristles together forming a pile having a predetermined height, the height of that portion of the pile on said one conveyor which carries a commodity being increased by such commodity beyond said predetermined height when said one conveyor is driven and the orientation of the commodity resting on said portion of the pile changes.

* * * * *

UNITED STATES PATENT AND TRADEMARK OFFICE
CERTIFICATE OF CORRECTION

PATENT NO. : 4,901,842
DATED : February 20, 1990
INVENTOR(S) : Horst LEMBCKE et al.

It is certified that error appears in the above-identified patent and that said Letters Patent is hereby corrected as shown below:

On the title page, under item [19] and in item [75] Inventors: "Lemboke" should read --Lembcke--.

Signed and Sealed this

Twenty-first Day of January, 1992

*Attest:*

HARRY F. MANBECK, JR.

*Attesting Officer*     *Commissioner of Patents and Trademarks*